United States Patent
Choi

(10) Patent No.: US 6,720,991 B1
(45) Date of Patent: Apr. 13, 2004

(54) APPARATUS AND METHOD FOR INTERFACING ANALOG VIDEO CAMCORDER AND PERSONAL COMPUTER WITH EACH OTHER

(75) Inventor: Yoon-Seop Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 09/270,740

(22) Filed: Mar. 16, 1999

(30) Foreign Application Priority Data

Mar. 16, 1998 (KR) .............................................. 98-8841

(51) Int. Cl.⁷ .............................................. H04N 5/225
(52) U.S. Cl. ................................ 348/207.1; 348/222.1; 348/512
(58) Field of Search .................... 348/207.1, 207.11, 348/512, 513, 514, 516, 517, 520, 537, 539, 207.99, 222.1, 572

(56) References Cited

U.S. PATENT DOCUMENTS

| | | | | |
|---|---|---|---|---|
| 2,717,276 A | * | 9/1955 | Schroeder | 348/493 |
| 4,754,331 A | * | 6/1988 | Wojcik et al. | 348/445 |
| 4,912,549 A | * | 3/1990 | Altman et al. | 348/512 |
| 5,268,750 A | * | 12/1993 | Stec et al. | 348/453 |
| 5,285,263 A | * | 2/1994 | Fujita | 348/571 |
| 5,301,240 A | * | 4/1994 | Stockum et al. | 348/220.1 |
| 5,367,341 A | * | 11/1994 | Schnorf | 348/616 |
| 5,396,295 A | * | 3/1995 | Furuta | 348/537 |
| 5,671,260 A | * | 9/1997 | Yamauchi et al. | 348/500 |
| 5,784,120 A | * | 7/1998 | Cummins et al. | 348/537 |
| 5,815,205 A | * | 9/1998 | Hashimoto et al. | 348/373 |
| 6,012,109 A | * | 1/2000 | Schultz | 710/56 |
| 6,211,909 B1 | * | 4/2001 | Maeshima et al. | 348/207.99 |
| 6,396,545 B1 | * | 5/2002 | O'Donnell | 348/537 |

FOREIGN PATENT DOCUMENTS

| | | | | |
|---|---|---|---|---|
| DE | 4109486 A1 | * | 9/1992 | G09G/1/02 |
| JP | 05328227 A | * | 12/1993 | H04N/5/335 |
| JP | 05328227 | * | 12/1993 | H04N/5/335 |

\* cited by examiner

Primary Examiner—Wendy R. Garber
Assistant Examiner—Jason Whipkey
(74) Attorney, Agent, or Firm—Staas & Halsey LLP

(57) ABSTRACT

An apparatus for and a method of interfacing an analog video camcorder and a personal computer with each other. A horizontal synchronous signal used for the analog video camcorder is delayed for a desired time in order to prevent a phenomenon in which a picture is displayed on a monitor of the personal computer while having a black portion at the leading portion thereof and being clipped at the trailing portion thereof when using a personal computer interface unit for digital video camcorders. By virtue of the delayed horizontal synchronous signal, the personal computer can receive information from the analog video camcorder without any problem. The apparatus and method are appropriately applied to portable imaging devices.

25 Claims, 7 Drawing Sheets

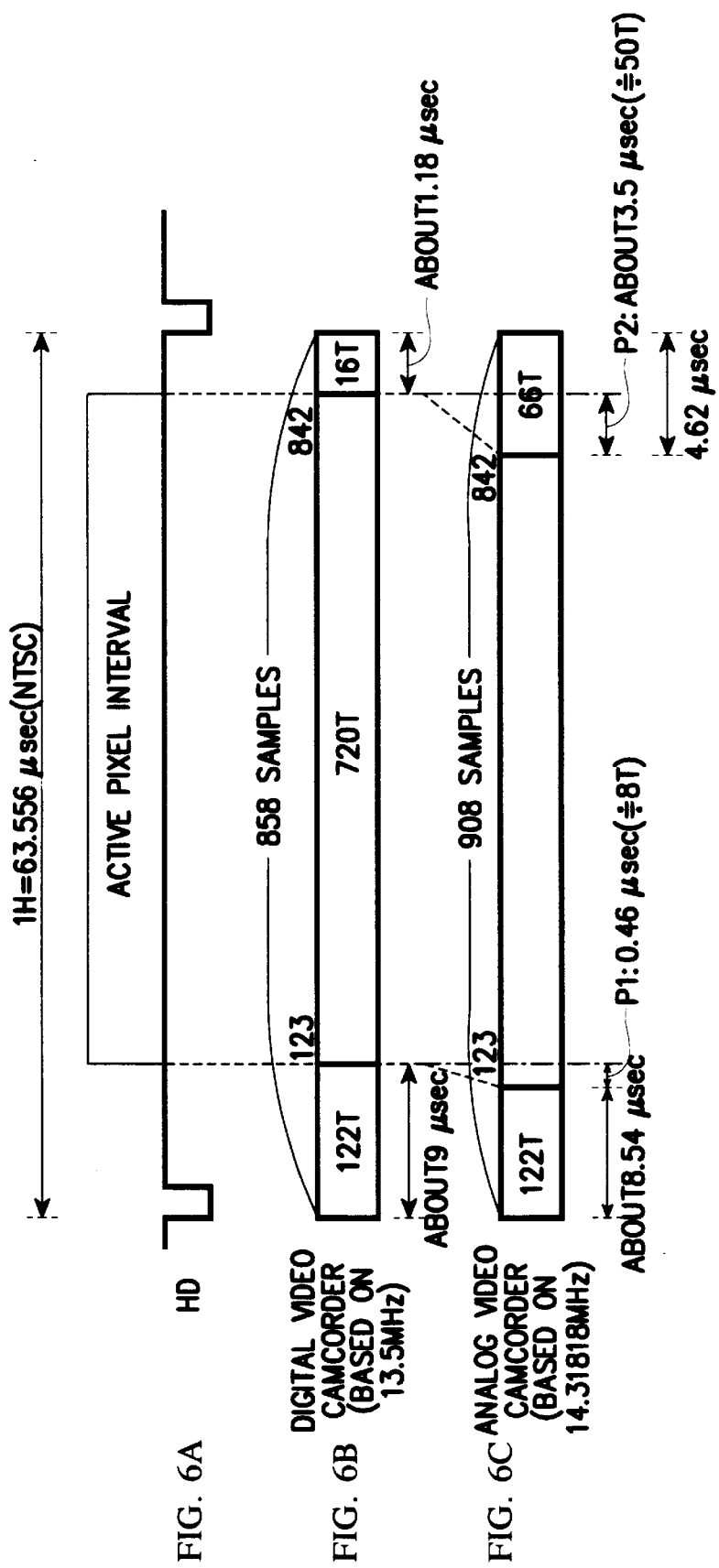

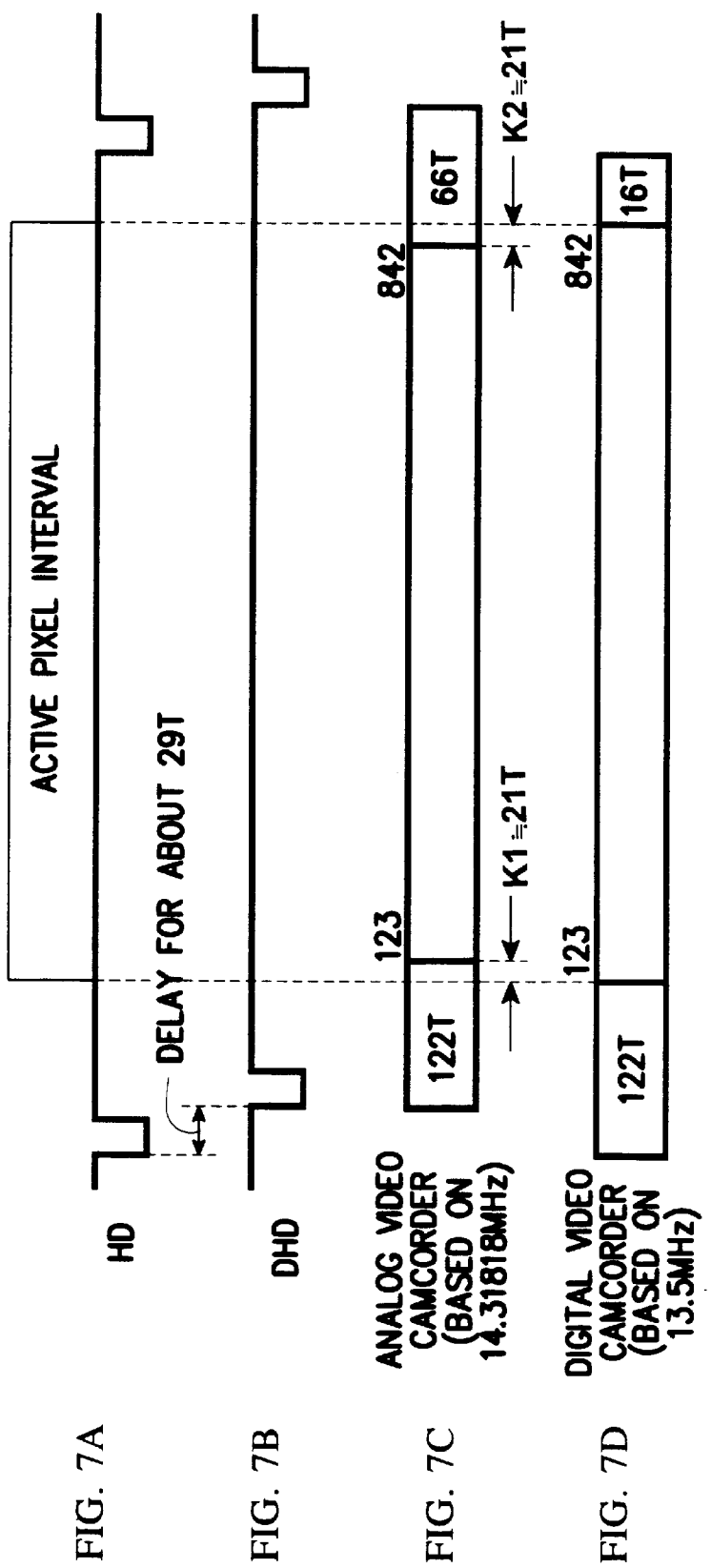

APPARATUS AND METHOD FOR INTERFACING ANALOG VIDEO CAMCORDER AND PERSONAL COMPUTER WITH EACH OTHER

CROSS-REFERENCE TO RELATED APPLICATIONS

This application claims the benefit of Korean Application No. 8841/1998, filed Mar. 16, 1998, in the Korean Patent Office, the disclosure of which is incorporated herein by reference.

BACKGROUND OF THE INVENTION

1. Field of the Invention

The present invention relates to a video recording and reproducing apparatus, and more particularly, to an apparatus for and a method of interfacing an analog video camcorder and a personal computer with each other.

2. Description of the Related Art

A video camcorder is a representative of portable imaging devices. Such a video camcorder has the function of a general video camera for imaging an object as well as the function of a video recorder for recording the image of the object. Using such a video camcorder, the user images a desired object and then records the image of the object onto a recording medium. The user can subsequently view the image recorded on the recording medium by reproducing that image. The recorded object image may be displayed through a view finder or liquid crystal display window mounted to the video camcorder or an external display device such as a television.

Video camcorders are mainly classified into those of the analog type, in which video recording and reproduction are processed in an analog regime, and those of the digital type, in which video recording and reproduction are processed in a digital regime. Digital video camcorders can interface with a personal computer via a personal computer interface unit such as an RS-232C interface chip (for example, Model No. SVC-9701 manufactured by Samsung Electronics Co., Ltd.) for digital video camcorders. However, analog video camcorders can not interface with any personal computer because they have a format incompatible with personal computer interface units used for digital video camcorders to interface with a personal computer.

SUMMARY OF THE INVENTION

Accordingly, an object of the invention is to provide an apparatus for and a method of interfacing an analog video camcorder and a personal computer with each other.

Another object of the invention is to provide an apparatus for and a method of allowing a personal computer to process a still image obtained by a portable analog imaging device.

Additional objects and advantages of the invention will be set forth in part in the description which follows and, in part, will be obvious from the description, or may be learned by practice of the invention.

The above and other objects of the present invention are achieved by providing an apparatus for interfacing an analog video camcorder and a personal computer with each other, including means for providing clock signals and control signals to be used for the analog video camcorder; a horizontal synchronous signal delay unit to delay a horizontal synchronous signal, which is one of the control signals, in such a fashion that a video picture output from the analog video camcorder is to be displayed on a monitor of the personal computer while being included, as much as possible, in a screen region defined on the monitor; and an interface unit having a function to interface the personal computer to a digital video camcorder, the interface unit performing an interfacing operation for the video picture output from the analog video camcorder in response to the delayed horizontal signal and the remainder of the control signals.

The above and other objects of the present invention are further achieved by providing a method of interfacing an analog video camcorder and a personal computer with each other, including the steps of providing clock signals and control signals to be used for the analog video camcorder; delaying a horizontal synchronous signal, which is one of the control signals, in such a fashion that a video picture output from the analog video camcorder is to be displayed on a monitor of the personal computer while being included, as much as possible, in a screen region defined on the monitor; and performing an interfacing process for the video picture output from the analog video camcorder in response to the delayed horizontal signal and the remainder of the control signals, thereby outputting the video picture to the personal computer.

BRIEF DESCRIPTION OF THE DRAWINGS

The foregoing and other objects, features and advantages of the present invention will become more apparent from the following detailed description when taken in conjunction with the accompanying drawings in which:

FIGS. 6A through 6C are diagrams illustrating a difference in active pixel intervals between a digital video camcorder and an analog video camcorder; and FIGS. 7A through 7D are diagrams for explaining the state of a video picture displayed on a personal computer monitor when a horizontal synchronous signal HD is delayed for a desired time in accordance with the embodiment of the present invention upon interfacing the analog video camcorder with the personal computer.

DESCRIPTION OF THE PREFERRED EMBODIMENT

Figure 1:
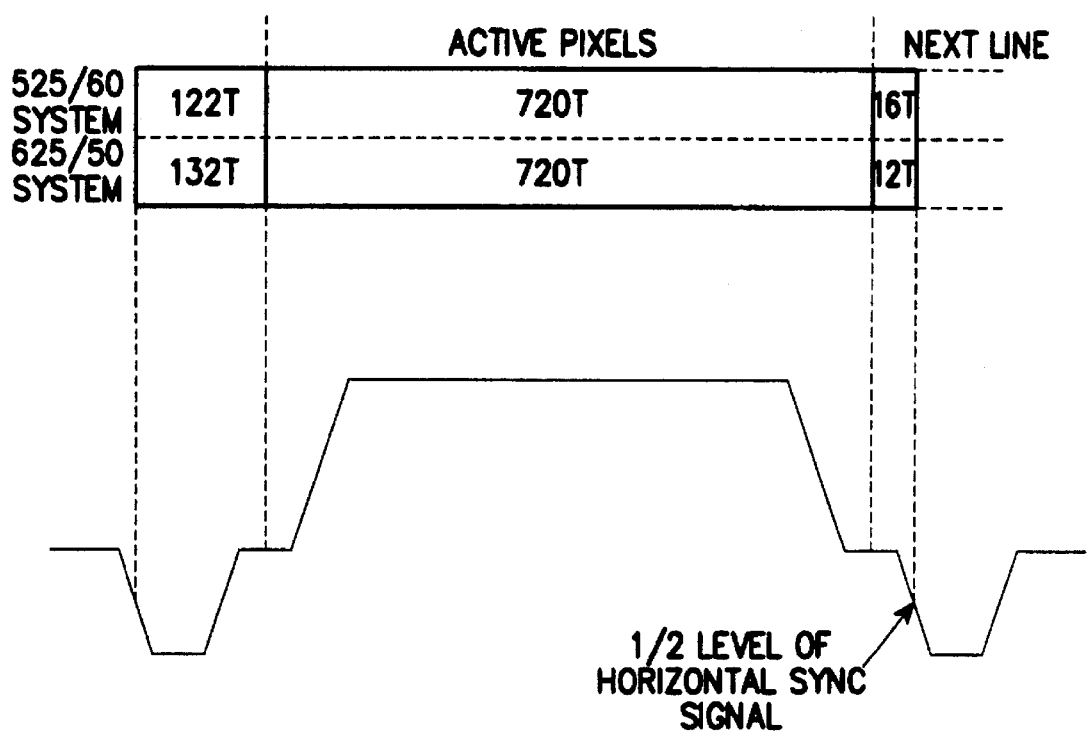
FIG. 1 is a diagram illustrating respective numbers of active pixels per line in luminance signals Y in 525/60 and 625/50 systems for digital video camcorders.

Reference will now made in detail to the present preferred embodiment of the present invention, examples of which are illustrated in the accompanying drawings, wherein like reference numerals refer to the like elements throughout. The embodiment is described below in order to explain the present invention by referring to the figures. In the following description of the present invention, a detailed description of known functions and configurations incorporated herein will be omitted when it may make the subject matter of the present invention rather unclear.

A format for video signals according to International Telecommunication Union-Radio Communication Sector (ITU-R) Broadcasting Technology Association.601 (BT.601) recommended by the International Telecommunication Union (ITU) will be described in conjunction with a sampling format practically used in digital video cassette recorders standardized by an international common standard. According to ITU-R BT.601, a luminance signal Y and chrominance signals $C_R$ and $C_B$ are sampled into a component format of 4:2:2. In both the 525/60 system (namely, National Television System Committee (NTSC) system) and the 625/50 system (namely, Phase Alternation by Line (PAL) system), sampling clocks used are 13.5 MHZ for the luminance signal Y and 6.75 MHZ for the chrominance signals $C_R$ and $C_B$. In both the 525/60 system and the 625/50 system, the number of active pixels per line is 720 for the luminance signal Y, as shown in FIG. 1, and 360 for the chrominance signals $C_R$ and $C_B$(not shown in FIG. 1). This is because only information usually involving no variation, namely, fixed information, exists in horizontal synchronous intervals. In FIG. 1, the reference character "T" represents one sampling interval.

Figure 2:
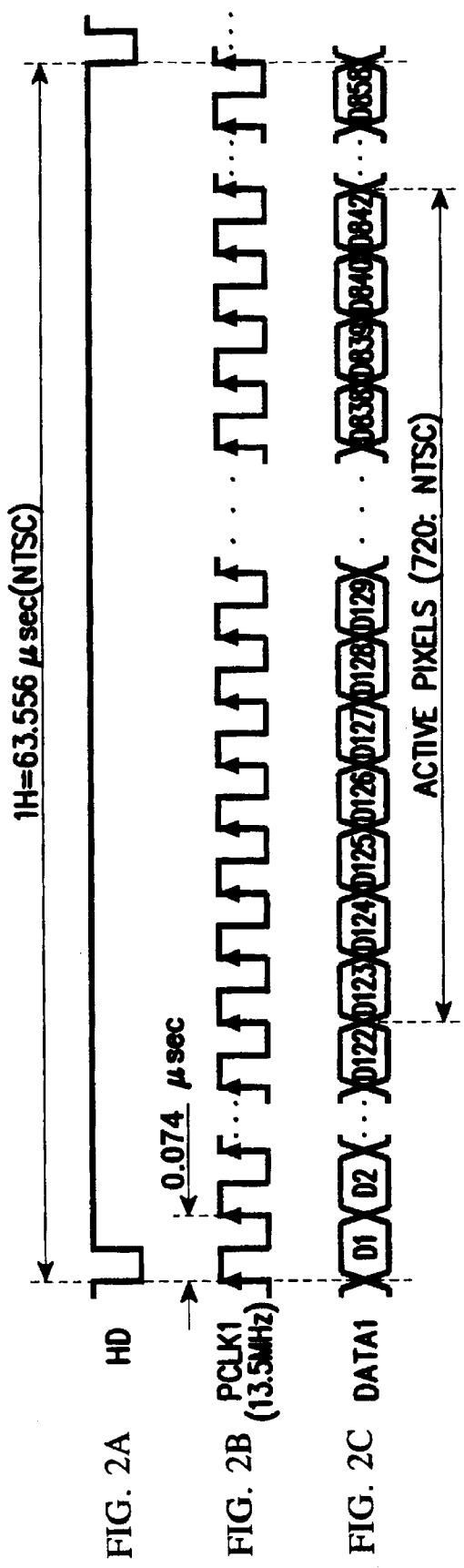
FIGS. 2A through 2C are diagrams illustrating a horizontal synchronous signal HD, a clock signal PCLK1, and luminance pixel data per line DATA1 used in a 525/60 system (NTSC system) for digital video camcorders, respectively.

FIGS. 2A through 2C show a horizontal synchronous signal HD, a clock signal PCLK1, and luminance pixel data per line DATA1 used in a 525/60 system (NTSC system) for digital video camcorders. In the 525/60 system (NTSC system), which is adapted for digital video camcorders, the period of the horizontal synchronous signal HD is 63.556 $\mu$s, and the frequency of the clock signal PCLK1 is 13.5 MHZ. Accordingly, the period of the clock signal PCLK1 is about 0.074 $\mu$s. The number of samples in the pixel data per line DATA1 is 858, whereas the number of active pixel samples is 720. The active pixel samples include the 123rd to 842nd samples. The intervals preceding and following the active pixel sample interval are a horizontal blanking interval and a burst signal interval, respectively.

Figure 3:
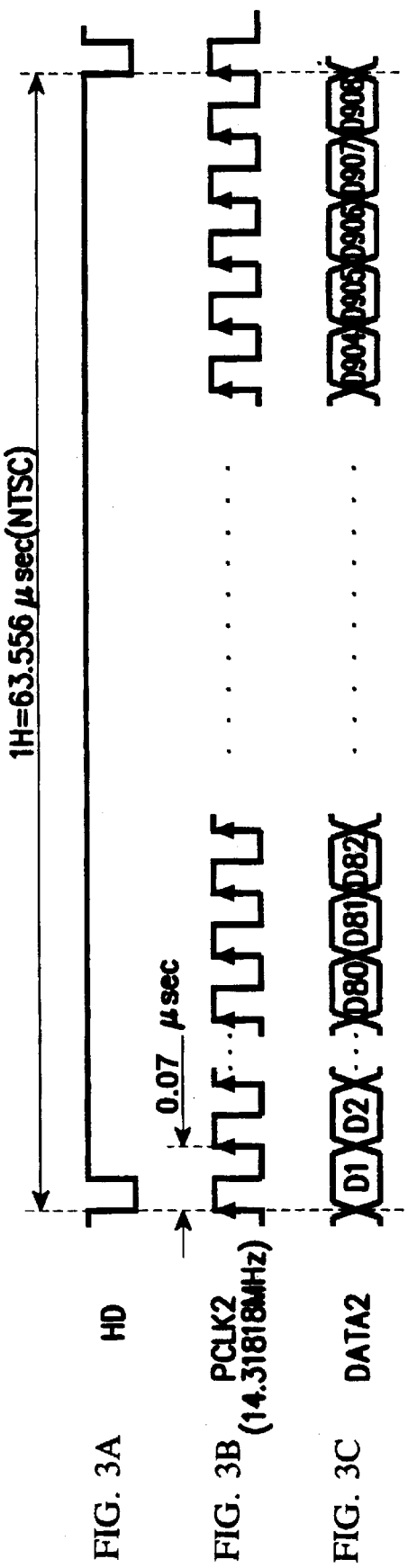
FIGS. 3A through 3C are diagrams illustrating a horizontal synchronous signal HD, a clock signal PCLK2, and luminance pixel data per line DATA2 used in a 525/60 system (NTSC system) for analog video camcorders, respectively.

On the other hand, FIGS. 3A through 3C show a horizontal synchronous signal HD, a clock signal PCLK2, and luminance pixel data per line DATA2 used in a 525/60 system (NTSC system) for analog video camcorders. In the 525/60 system (NTSC system), which is adapted for analog video camcorders such as 8 mm video camcorders, the period of the horizontal synchronous signal HD is 63.556 $\mu$s, the same as for digital video camcorders. In this case, however, the period of the clock signal PCLK2 and the number of samples in the pixel data per line DATA2 are different from those for digital video camcorders. The frequency of the clock signal PCLK2 for analog video camcorders is 14.31818 MHZ. Therefore, the period of the clock signal PCLK2 is about 0.07 $\mu$s. The number of samples in the pixel data per line DATA2 is about 908.

In accordance with an embodiment of the present invention, an interface between an analog video camcorder involving a timing shown in FIGS. 3A through 3C and a personal computer is realized using a personal interface unit such as an RS-232C interface chip (for example, Model No. SVC-9701 manufactured by Samsung Electronics Co., Ltd.) for digital video camcorders, which chip involves a timing shown in FIGS. 2A through 2C.

Figure 4:
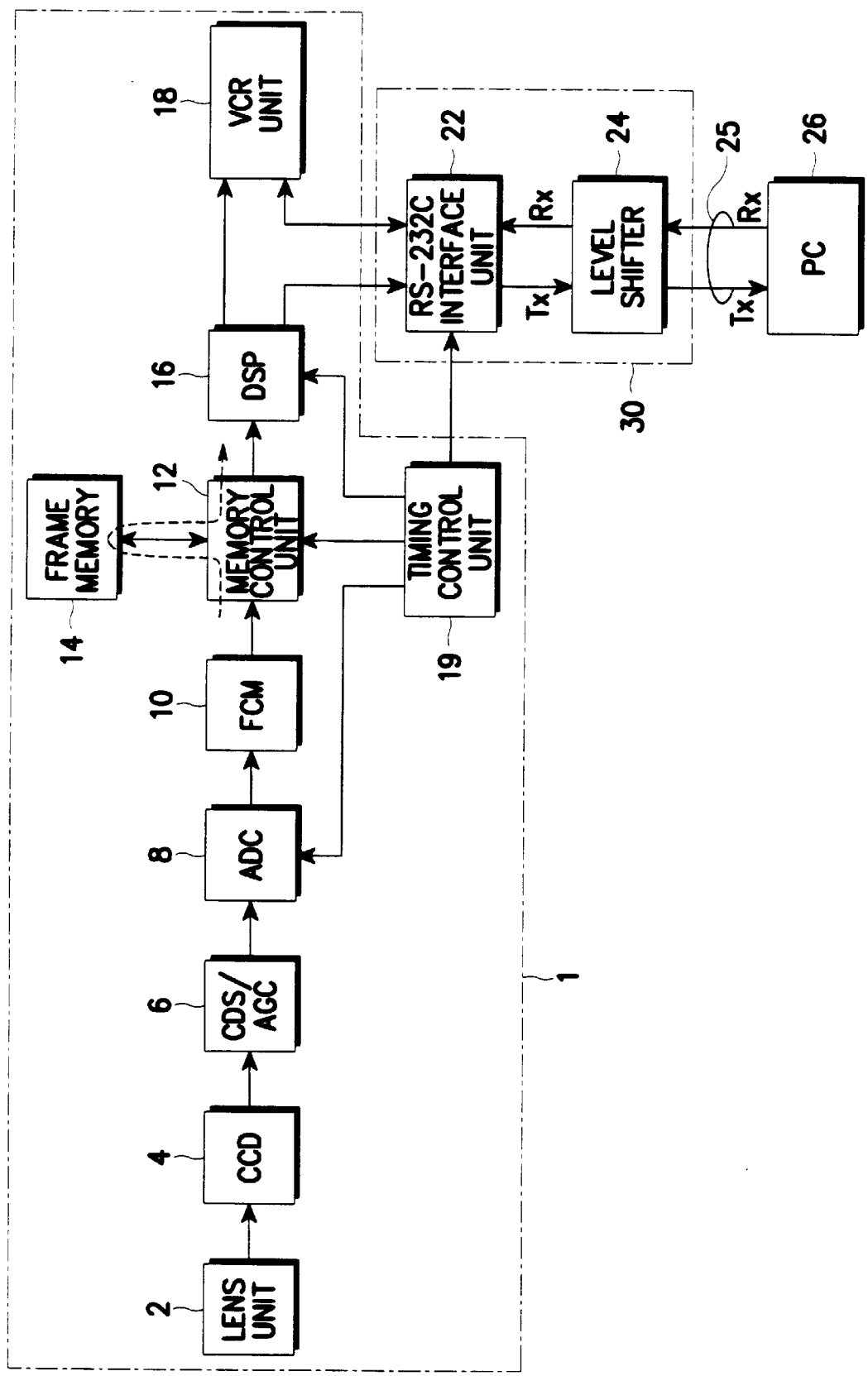
FIG. 4 is a block diagram illustrating a configuration according to an embodiment of the present invention in which a personal interface unit is included to provide an interface between an analog video camcorder and a personal computer.

FIG. 4 illustrates a block diagram of a configuration according to the embodiment of the present invention in which a personal interface unit is included to provide an interface between an analog video camcorder and a personal computer. Referring to FIG. 4, an analog video camcorder 1 interfaces with a personal computer 26 via a personal computer interface unit 30. The personal computer interface unit 30 includes an RS-232C interface unit 22 for video camcorders, and a level shifter 24.

In the analog video camcorder 1, a lens unit 2 includes a zoom lens, a focus lens, and an iris, etc. The zoom lens moves forwardly and rearwardly along an optical axis thereof in accordance with an operation of a zoom motor, thereby increasing and decreasing the magnification of an object. The focus lens moves forwardly and rearwardly along an optical axis thereof in accordance with an operation of a focus motor, thereby focusing an optical image of the object. On the other hand, the iris is opened and closed by an iris meter driven by an iris controller, so as to adjust the amount of incident light. A charge coupled device (CCD) 4 converts an optical signal, indicative of the image of an object, into an electrical signal (picked-up video signal). A correlated double sampling/auto gain control (CDS/AGC) unit 6 carries out a correlated double sampling, an auto gain control, a shading correction, and a potential gamma correction for the picked-up video signal. An analog signal output from the CDS/AGC unit 6 is converted into digital data by an analog-to-digital converter (ADC) 8. The resultant output from the ADC 8 is stored in a frequency conversion memory (FCM) 10. The FCM 10 is a memory for storing data therein in order to offset the difference between a CCD driving clock (for example, 18 MHZ) and a digital signal processor (DSP) driving clock (for example, 14.31818 MHZ). That is, data is written into the FCM 10 in response to the CCD driving clock (for example, 18 MHZ) and is read out of the FCM 10 in response to the DSP driving clock (for example, 14.31818 MHZ).

Data read out of the FCM 10 is stored in a frame memory 14 under the control of a memory control unit 12. The frame memory 14 stores data of a size corresponding to one frame therein. The data stored in the frame memory 14 is read out again by the memory control unit 12 which, in turn, applies the read-out data to a DSP 16. The DSP 16 processes a one-field video signal output from the memory control unit 12, thereby converting it into luminance and chrominance video signals Y and C of the NTSC or PAL. The luminance and chrominance video signals Y and C are then applied to a video cassette recorder (VCR) unit 18. A timing control unit 19 is also provided in the analog video camcorder 1 in order to perform a control for generating various timing control signals under the control of a microcomputer (not shown). The timing control signals may include a clock signal for distinguishing chrominance signals $C_R$ and $C_B$ from each other, a horizontal synchronous signal HD, a vertical synchronous signal, and a clock signal PCLK2 (14.31818 MHZ), etc.

Referring to FIG. 4, the personal computer interface unit 30, which interfaces the analog video camcorder 1 with the personal computer 26, includes the RS-232C interface unit 22 and the level shifter 24, as mentioned above. The personal computer interface unit 30 is connected to the personal computer 26 via an RS-232C cable 25. The RS-232C interface unit 22 is used for digital video camcorders. In accordance with the embodiment of the present invention, Model No. SVC-9701 is used for the RS-232C interface unit 22.

Figure 5:
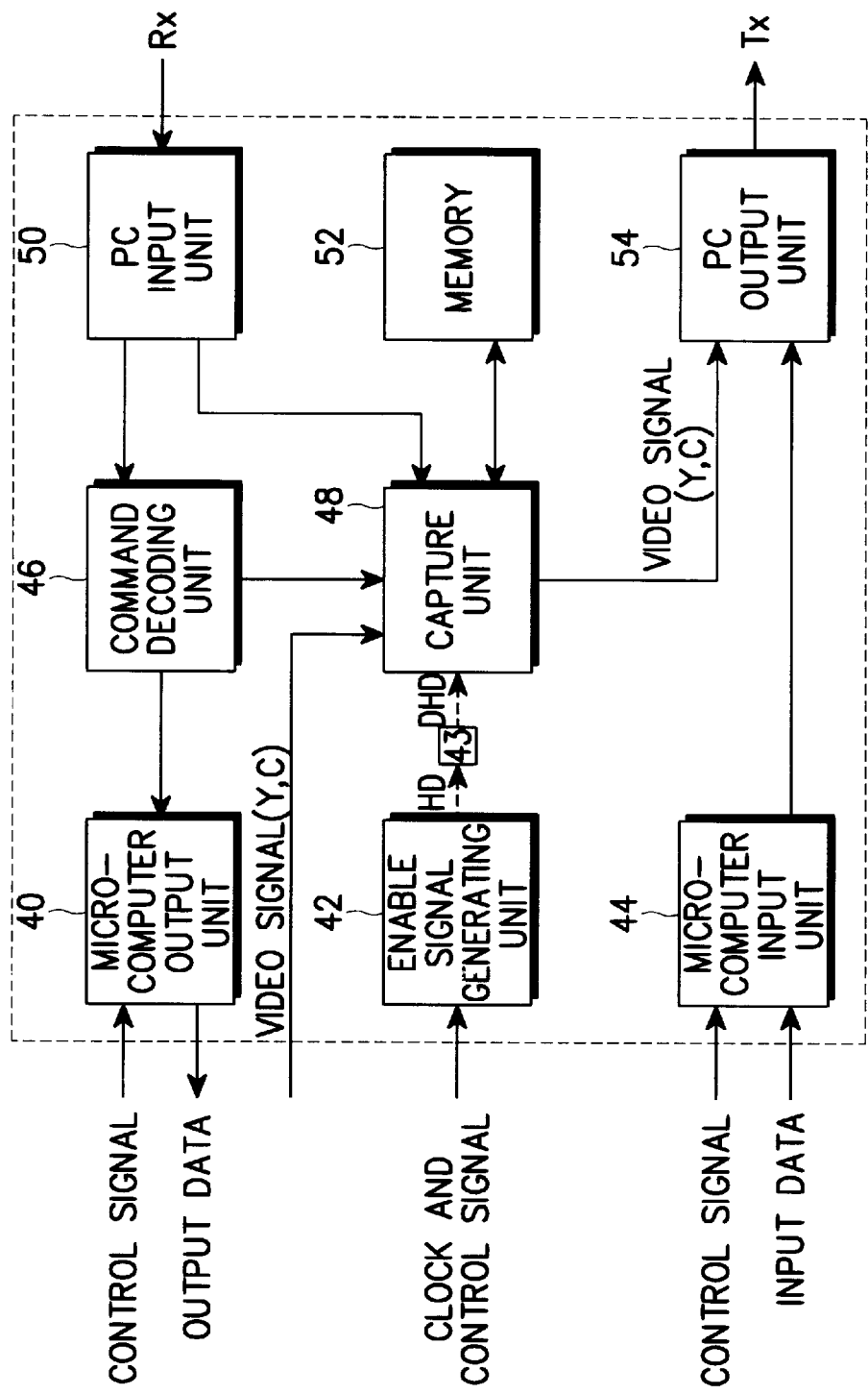
FIG. 5 is a block diagram illustrating a detailed configuration of an RS-232C interface unit shown in FIG. 4.

As shown in FIG. 5, the RS-232C interface unit 22 includes a microcomputer output unit 40, an enable signal generating unit 42, a microcomputer input unit 44, a command decoding unit 46, a capture unit 48, a personal computer input unit 50, a memory 52, and a personal computer output unit 54. The microcomputer output unit 40 sends a command output from the personal computer 26 to the microcomputer of the analog video camcorder 1. At this time, the microcomputer output unit 40 converts data of an RS-232C format into that of a serial data format. The enable signal generating unit 42 generates various enable signals required for blocks in the RS-232C interface unit 22 under the control of the microcomputer. For instance, the enable signal generating unit 42 receives a horizontal synchronous signal HD output from the timing control unit 19 and sends it to an associated block. The microcomputer input unit 44 receives data sent from the microcomputer for its transfer to the personal computer 26. The command decoding unit 46 is a block for analyzing the command output from the personal computer 26. The capture unit 48 is a block which performs a desired processing (for example, a down sampling) for the luminance and chrominance video signals Y and C output from the VCR unit 18 or DSP 16 and temporarily stores the luminance and chrominance video signals Y and C in the memory 52. The personal computer input unit 50 is a block for receiving RS-232C data sent from the personal computer 26. The personal computer input unit 50 determines a baud rate for the received signal Rx, based on the start bit of the signal Rx. The memory 52 is a memory for temporarily storing the luminance and chrominance video signals Y and C sent from the DSP 16 or VCR unit 18. The personal computer output unit 54 adds a start byte and an end byte to the luminance and chrominance signals Y and C output from the capture unit 48 and then sends the resultant signals to the personal computer 26.

Referring to FIG. 4 again, the signal applied from the DSP 16 to the RS-232C interface unit 22 has a format of $Y:C_R:C_B=4:1:1$, whereas the signal applied from the RS-232C interface unit 22 to the level shifter 24 has a format of $Y:C_R:C_B=4:2:2$.

The level shifter 24 arranged between the RS-232C interface unit 22 and the personal computer 26 serves to shift (adjust) the level of data being transferred between the analog video camcorder 1 and the personal computer 26 because the analog video camcorder 1 and personal computer 26 use different drive voltages, respectively. The personal computer 26 normally uses a voltage source of 12V whereas the DSP 16 and VCR unit 18 of the analog video camcorder 1 normally use voltage sources of 5V and 3V. Where a data transfer from the RS-232C interface unit 22 to the personal computer 26 is performed, accordingly, the level shifter 22 shifts the level of data from $5V_{PP}$ to $12V_{PP}$. On the other hand, the level shifter 22 shifts the level of data from $12V_{PP}$ to $5V_{PP}$, when a data transfer from the personal computer 26 to the RS-232C interface unit 22 is performed.

Since the RS-232C interface unit 22 shown in FIGS. 4 and 5 is adapted for digital video camcorders, the configuration of FIG. 4 using the RS-232C interface unit 22 basically involves a phenomenon that a clipped video picture not corresponding to the original image is displayed on the monitor of the personal computer 26. This will be described in detail in conjunction with FIGS. 6A through 6C.

Referring to FIGS. 6A through 6C, where sampling is carried out at the frequency of the clock signal PCLK1, namely, at 13.5 MHZ, which is used in digital video camcorders, the time interval preceding an active pixel interval including 720 pixel samples (720T) from the 123rd pixel sample to the 842nd pixel sample forming a video picture, namely, the time interval of 122T preceding the 123rd pixel sample, is about 9 $\mu$sec ($\approx$1/13.5 MHZ×122T). On the other hand, where sampling is carried out at the frequency of the clock signal PCLK2, namely, at 14.31818 MHZ, which is used in analog video camcorders, in accordance with the illustrated embodiment of the present invention, the time interval of 122T preceding the 123rd pixel sample, is about 8.54 $\mu$sec ($\approx$1/14.31818 MHZ×122T). Accordingly, there is a difference P1 of about 0.46 $\mu$sec between the start point of the composed video picture (namely, the 123rd pixel sample) in the digital video camcorder and the start point of the composed video picture (namely, the 123rd pixel sample) in the analog video camcorder (P1=9−8.54=0.46 ($\mu$sec)). In other words, the picture composition start point in the analog video camcorder is earlier than that in the digital video camcorder by 0.46 $\mu$sec corresponding to about 8T (based on 14.31818 MHZ). Therefore, where sampling is carried out at 14.31818 MHZ, namely, the frequency of the clock signal PCLK2, the interval (black) preceding the active pixel interval is further sampled by 8 times, as compared to the sampling in the digital video camcorder.

Also, the picture composition end point in the analog video camcorder (namely, the 842nd pixel sample) is earlier than that in the digital video camcorder by a time P2 of 3.5 $\mu$sec (P2=4.62−1.18=3.5 ($\mu$sec)). Therefore, where sampling is carried out at 14.31818 MHZ, namely, the frequency of the clock signal PCLK2, the active pixel interval is less sampled by 50 times, as compared to the sampling in the digital video camcorder.

As a result, the video picture displayed on the monitor of the personal computer 26 via the analog video camcorder 1 and PC interface unit 30 may have a black portion corresponding to about 8T at the leading portion thereof and is in a clipped state by about 50T at the trailing portion thereof.

To this end, in accordance with the illustrated embodiment of the present invention, the horizontal synchronous signal HD, which is to be applied to the RS-232C interface unit 22 of FIG. 4, is delayed for a predetermined time in order to allow a large portion of the video picture (in particular, at least the central portion of the video picture) output from the analog video camcorder to be included, as much as possible, in the active pixel interval associated with the digital video camcorder. This delay of the horizontal synchronous signal HD is carried out in the RS-232C interface unit 22.

For example, in the case of FIGS. 6A through 6C, the delay time of the horizontal synchronous signal HD is preferably about 29T (29T=(50T+8T)/2), allowing the central portion of the video picture output from the analog video camcorder 1 to be included, as much as possible, in the screen region of the monitor of the personal computer 26. This will be described in detail as follows.

When the user images an object, typically, he centrally frames an image of the object. Therefore, the resultant video picture exhibits a higher information importance at the central portion thereof while exhibiting a lower information importance at the leading, trailing and edge portions thereof. In this regard, there is no significant problem associated with the viewing of the video picture even if the video picture is partially clipped at the leading and trailing portions thereof. Where the horizontal synchronous signal HD is delayed for about 50T, the trailing portion of the video picture is completely displayed. In this case, however, the leading portion of the video picture is clipped by about 42T (=50T−8T). As a result, the central portion of the video picture is in a state shifted toward the trailing end of the screen, so that the user may be somewhat dissatisfied with the resultant video picture. If the clipped-out portion of the video picture contains important information, a loss of such important information then occurs. On the other hand, where the horizontal synchronous signal HD is delayed for about 8T, the leading portion of the video picture is completely displayed. In this case, however, the trailing portion of the video picture is clipped by about 42T (=50T−8T). As a result, the user may be somewhat dissatisfied with the resultant video picture. If the clipped-out portion of the video picture contains important information, a loss of such important information then occurs.

FIGS. 7A through 7D illustrate the case in which the horizontal synchronous signal HD is delayed for about 29T, so that the video picture output from the analog video camcorder is displayed on the monitor of the personal computer 26 without causing significant problems associated with the viewing of the video picture. Referring to FIGS. 7A and 7B, a horizontal synchronous signal DHD is shown which corresponds to the horizontal synchronous signal HD and is delayed for about 29T. Using the delayed horizontal synchronous signal DHD, the video picture output from the analog video camcorder is displayed on the monitor of the personal computer 26 while being clipped at the leading and trailing portions thereof by amounts K1 and K2 (K1≈21T; and K2≈21T), respectively. Although the output video picture is clipped at the leading and trailing portions thereof by 21T, respectively, as above, there is no significant problem for the user of the personal computer 26 to view the video picture.

The configuration for delaying the horizontal synchronous signal HD for a desired time, namely, generating the delayed horizontal synchronous signal DHD, is embodied in the RS-232C interface unit 22 shown in FIG. 4.

Referring to FIG. 5 illustrating a detailed configuration of the RS-232C interface unit 22 shown in FIG. 4, a separate delay element 43 may be arranged between the enable signal generating unit 42 for outputting the horizontal synchronous signal HD and the capture unit 48 for receiving the horizontal synchronous signal HD, so as to delay the horizontal synchronous signal HD for a desired time as mentioned above. In this case, the delay element generates a delayed horizontal synchronous signal DHD. The delay element 43 may be embodied by a number of inverters (not shown), such as an even number of inverters so that the horizontal synchronous signal HD and the delayed horizontal synchronous signal might grow to be in-phase as shown in FIGS. 7A and 7B. Alternatively, the capture unit 48 itself may have a function to delay its operation for reading video data from the memory 52 in response to the horizontal synchronous signal HD generated from the enable signal generating unit 42. In this case, the capture unit 48 has the same effect as generating the delayed horizontal signal DHD.

In accordance with the above mentioned configuration, the still video picture stored in the frame memory 14 of the analog video camcorder 1 shown in FIG. 4 is transferred to the personal computer 26 which, in turn, displays the video picture on the monitor thereof without causing significant problems associated with the viewing of the video picture. The still picture is stored for every frame in the frame memory 14. Accordingly, the user can view the still picture for every frame through the monitor of the personal computer 26. In the case of using the NTSC system, the still picture can be transferred to the personal computer 26 at a rate corresponding to 30 frames per second. On the other hand, in the case using the PAL system, the still picture can be transferred to the personal computer 26 at a rate corresponding to 25 frames per second.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims. For example, although the present invention has been described in conjunction with the case in which the horizontal synchronous signal HD is delayed for 29T, it should be understood that the spirit of the present invention is to delay the horizontal synchronous signal HD so that the central portion of a picture to be displayed is included, as much as possible, in the screen of the personal computer. Although the present invention has also been described in conjunction with video signals applied from the DSP 16 of the analog video camcorder 1 to the RS-232C interface unit 22, video signals reproduced from a tape of the VCR unit 18 may be applied to the RS-232C interface unit 22.

As apparent from the above description, the present invention makes it possible to allow a personal computer to appropriately receive information from an analog video camcorder by use of a personal computer interface unit for digital video camcorders.

What is claimed is:

1. An apparatus for interfacing an analog video camcorder which outputs a video picture and a personal computer having a monitor with each other, comprising:

a unit providing clock signals and control signals including a horizontal synchronous signal to be used for the analog video camcorder;

a horizontal synchronous signal delay unit to delay the horizontal synchronous signal so that the video picture output from said analog video camcorder is to be displayed on the monitor of the personal computer while being included, as much as possible, in a screen region defined on the monitor; and an interface unit to interface the personal computer to the analog video camcorder, said interface unit to perform an interfacing operation for the video picture output from the analog video camcorder in response to the delayed horizontal signal and the remainder of the control signals, wherein the horizontal synchronous signal delay unit delays the horizontal synchronous signal by an average that the interface unit clips a leading portion and a trailing portion of the video picture.

2. The apparatus as claimed in claim 1, wherein said horizontal synchronous signal delay unit is formed in said interface unit.

3. The apparatus as claimed in claim 1, wherein said interface unit comprises:

an RS-232C interface unit to perform the interfacing operation; and a level shifter to adjust levels of data being transferred between the analog video camcorder and the personal computer through the RS-232C interface unit, during the interfacing operation.

4. The apparatus as claimed in claim 3, wherein:

the RS-232C interface unit is connected to the analog video camcorder; and the level shifter is connected between said RS-232C interface unit and the personal computer.

5. The apparatus as claimed in claim 3, wherein the level shifter shifts a level of the transferred data from $5V_{PP}$ to $12V_{PP}$ for data transfer from said RS-232C interface unit to the personal computer, and shifts the level of the transferred data from $12V_{PP}$ to $5V_{PP}$ for data transfer from the personal computer to said RS-232C interface unit.

6. The apparatus as claimed in claim 3, wherein the analog video camcorder outputs luminance and chrominance signal relating to the video picture, and said interface unit comprises a memory, an enable signal generating unit to receive the horizontal synchronous signal from the analog video camcorder, and a capture unit to process luminance and chrominance signals and temporarily store the processed luminance and chrominance signals in the memory and output the processed luminance and chrominance signals from the memory in accordance with the delayed horizontal synchronous signal; and said horizontal synchronous signal delay unit comprises a delay element connected between the enable signal generating unit and the capture unit, to delay the horizontal synchronous signal received from the enable signal generating unit, to generate the delayed horizontal synchronous signal.

7. The apparatus as claimed in claim 3, wherein the analog video camcorder outputs luminance and chrominance signal relating to the video picture, and said interface unit comprises a memory;

an enable signal generating unit to receive the horizontal synchronous signal from the analog video camcorder, and a capture unit to process luminance and chrominance signals and temporarily store the processed luminance and chrominance signals in said memory and output the processed luminance and chrominance signals from the memory in accordance with the horizontal synchronous signal received from the enable signal generating unit; and said horizontal synchronous signal delay unit comprises a delay unit formed in said capture unit to delay reading of the chrominance and luminance signals from said memory for an amount of time in response to the horizontal synchronous signal.

8. The apparatus as claimed in claim 3, wherein the analog video camcorder samples the video picture at a clock signal frequency of about 14.318 MHz, has an active pixel sample interval of 720 samples, which are formed of the $123^{rd}$ to $842^{nd}$ samples in a pixel data line of 858, and the horizontal synchronous signal delay unit delays the horizontal synchronous signal by about 29T, where T is a sampling interval.

9. The apparatus as claimed in claim 1, wherein said horizontal synchronous signal delay unit delays the horizontal synchronous signal so that a central portion of a frame of the video picture is displayed centered on the monitor of the personal computer.

10. The apparatus as claimed in claim 1, wherein the analog video camcorder outputs luminance and chrominance signal relating to the video picture, and said interface unit comprises a memory, an enable signal generating unit to receive the horizontal synchronous signal from the analog video camcorder, and a capture unit to process luminance and chrominance signals and temporarily store the processed luminance and chrominance signals in the memory and output the processed luminance and chrominance signals from the memory in accordance with the delayed horizontal synchronous signal; and said horizontal synchronous signal delay unit comprises a delay element connected between the enable signal generating unit and the capture unit, to delay the horizontal synchronous signal received from the enable signal generating unit, to generate the delayed horizontal synchronous signal.

11. The apparatus as claimed in claim 10, wherein the analog video camcorder samples the video picture at a clock signal frequency of about 14.318 MHz, has an active pixel sample interval of 720 samples, which are formed of the $123^{rd}$ to $842^{nd}$ samples in a pixel data line of 858, and said delay element delays the horizontal synchronous signal by about 29T, where T is a sampling interval.

12. The apparatus as claimed in claim 1, wherein the analog video camcorder outputs luminance and chrominance signal relating to the video picture, and said interface unit comprises a memory;

an enable signal generating unit to receive the horizontal synchronous signal from the analog video camcorder, and a capture unit to process luminance and chrominance signals and temporarily store the processed luminance and chrominance signals in said memory and output the processed luminance and chrominance signals from the memory in accordance with the horizontal synchronous signal received from the enable signal generating unit; and said horizontal synchronous signal delay unit comprises a delay unit formed in said capture unit to delay reading of the chrominance and luminance signals from said memory for an amount of time in response to the horizontal synchronous signal.

13. The apparatus as claimed in claim 12, wherein the analog video camcorder samples the video picture at a clock signal frequency of about 14.318 MHz, has an active pixel sample interval of 720 samples, which are formed of the $123^{rd}$ to $842^{nd}$ samples in a pixel data line of 858, and said delay unit delays the horizontal synchronous signal by about 29T, where T is a sampling interval.

14. The apparatus as claimed in claim 1, wherein the analog video camcorder samples the video picture at a clock signal frequency of about 14.318 MHz, has an active pixel sample interval of 720 samples, which are formed of the $123^{rd}$ to $842^{nd}$ samples in a pixel data line of 858, and the horizontal synchronous signal delay unit delays the horizontal synchronous signal by about 29T, where T is a sampling interval.

15. An apparatus for interfacing an analog portable imaging device which outputs a video picture and a horizontal synchronous signal with a personal computer having a monitor, comprising:

an interface unit to interface the analog portable imaging device with the personal computer, to perform an interfacing operation for the video picture output from the analog portable imaging device in response; and a delay unit to delay the video picture output from the analog portable imaging device to the personal computer, to improve centering of the video picture on the monitor, wherein the delay unit delays the horizontal synchronous signal by an average that the interface unit clips a leading portion and a trailing portion of the video picture.

16. The apparatus as claimed in claim 15, wherein said interface unit comprises:
an RS-232C interface unit to perform the interfacing operation; and
a level shifter to adjust levels of data being transferred between the analog portable imaging device analog video camcorder and the personal computer through the RS-232C interface unit, during the interfacing operation.

17. The apparatus as claimed in claim 16, wherein:
the RS-232C interface unit is connected to the analog portable imaging device; and
the level shifter is connected between said RS-232C interface unit and the personal computer.

18. The apparatus as claimed in claim 15, wherein the analog portable imaging device outputs luminance and chrominance signal relating to the video picture, and said interface unit comprises
a memory,
an enable signal generating unit to receive the horizontal synchronous signal from the analog portable imaging device, and
a capture unit to process luminance and chrominance signals and temporarily store the processed luminance and chrominance signals in the memory and output the processed luminance and chrominance signals from the memory in accordance with the delayed horizontal synchronous signal; and
said delay unit comprises a delay element connected between the enable signal generating unit and the capture unit, to delay the horizontal synchronous signal received from the enable signal generating unit, to generate a delayed horizontal synchronous signal.

19. The apparatus as claimed in claim 15, wherein the analog portable imaging device outputs luminance and chrominance signal relating to the video picture, and said interface unit comprises
a memory;
an enable signal generating unit to receive the horizontal synchronous signal from the analog portable imaging device, and
a capture unit to process luminance and chrominance signals and temporarily store the processed luminance and chrominance signals in said memory and output the processed luminance and chrominance signals from the memory in accordance with the horizontal synchronous signal received from the enable signal generating unit; and
said delay unit is formed in said capture unit to delay reading of the chrominance and luminance signals from said memory for an amount of time in response to the horizontal synchronous signal.

20. An apparatus for interfacing an analog portable imaging device which samples a video picture with a first clock signal of a first frequency and a horizontal synchronous signal with a personal computer having a monitor, comprising:
an interface unit designed to operate at a second clock signal of a second frequency different from the first frequency, to perform an interfacing operation for the video picture output from the analog portable imaging device in response; and
a delay unit to delay the video picture output from the analog portable imaging device to pass from said interface unit to the personal computer, to improve centering of the video picture on the monitor, wherein the delay unit delays the horizontal synchronous signal by an average that the interface unit clips a leading portion and a trailing portion of the video picture.

21. The apparatus as claimed in claim 20, wherein the analog portable imaging device outputs luminance and chrominance signal relating to the video picture, and said interface unit comprises
a memory,
an enable signal generating unit to receive the horizontal synchronous signal from the analog portable imaging device, and
a capture unit to process luminance and chrominance signals and temporarily store the processed luminance and chrominance signals in the memory and output the processed luminance and chrominance signals from the memory in accordance with the delayed horizontal synchronous signal; and
said delay unit comprises a delay element connected between the enable signal generating unit and the capture unit, to delay the horizontal synchronous signal received from the enable signal generating unit, to generate the delayed horizontal synchronous signal.

22. The apparatus as claimed in claim 20, wherein the analog portable imaging device analog video camcorder outputs luminance and chrominance signal relating to the video picture, and said interface unit comprises
a memory;
an enable signal generating unit to receive the horizontal synchronous signal from the analog portable imaging device, and
a capture unit to process luminance and chrominance signals and temporarily store the processed luminance and chrominance signals in said memory and output the processed luminance and chrominance signals from the memory in accordance with the horizontal synchronous signal received from the enable signal generating unit; and
said delay unit comprises a delay unit formed in said capture unit to delay reading of the chrominance and luminance signals from said memory for an amount of time in response to the horizontal synchronous signal.

23. A method of interfacing an analog video camcorder which outputs a video picture and a personal computer having a monitor with each other, comprising:
providing clock signals and control signals including a horizontal synchronous signal to be used for the analog video camcorder;
delaying the horizontal synchronous signal so that the video picture output from the analog video camcorder is to be displayed on the monitor of the personal computer while being included, as much as possible, in a screen region defined on the monitor; and
performing an interfacing process for the video picture output from the analog video camcorder in response to the delayed horizontal signal and the remainder of the control signals, thereby outputting the video picture to the personal computer, wherein the horizontal synchronous signal is delayed by an average that the interface process clips a leading portion and a trailing portion of the video picture.

24. The method as claimed in claim 23, wherein the step of performing an interfacing process comprises storing luminance and chrominance signals of the video picture in a memory which is between the analog video camcorder and the personal computer and retrieving the stored luminance and chrominance signals for transmission to the personal computer in accordance with the delayed horizontal synchronous signal.

25. A method of interfacing an analog portable imaging device which outputs a video picture and a personal computer having a monitor with each other, comprising:

provinding a horizontal synchronous signal to be used for the analog portable imaging device;

delaying the horizontal synchronous signal so that a center portion of the video picture output from said analog portable imaging device is displayed centered on the monitor of the personal computer; and performing an interfacing process for the video picture output from the analog portable imaging device in response to the delayed horizontal signal, thereby outputting the video picture to the personal computer, wherein the horizontal synchronous signal is delayed by an average that the interface process clips a leading portion and a trailing portion of the video picture.

* * * * *

UNITED STATES PATENT AND TRADEMARK OFFICE
CERTIFICATE OF CORRECTION

PATENT NO. : 6,720,991 B1
DATED : April 13, 2004
INVENTOR(S) : Yoon-seop Choi

It is certified that error appears in the above-identified patent and that said Letters Patent is hereby corrected as shown below:

Column 11,
Lines 6-7, delete "analog video camcorder";

Column 12,
Line 25, delete "analog video camcorder".

Signed and Sealed this

Thirteenth Day of July, 2004

JON W. DUDAS
*Acting Director of the United States Patent and Trademark Office*